United States Patent Office 3,128,864
Patented Apr. 14, 1964

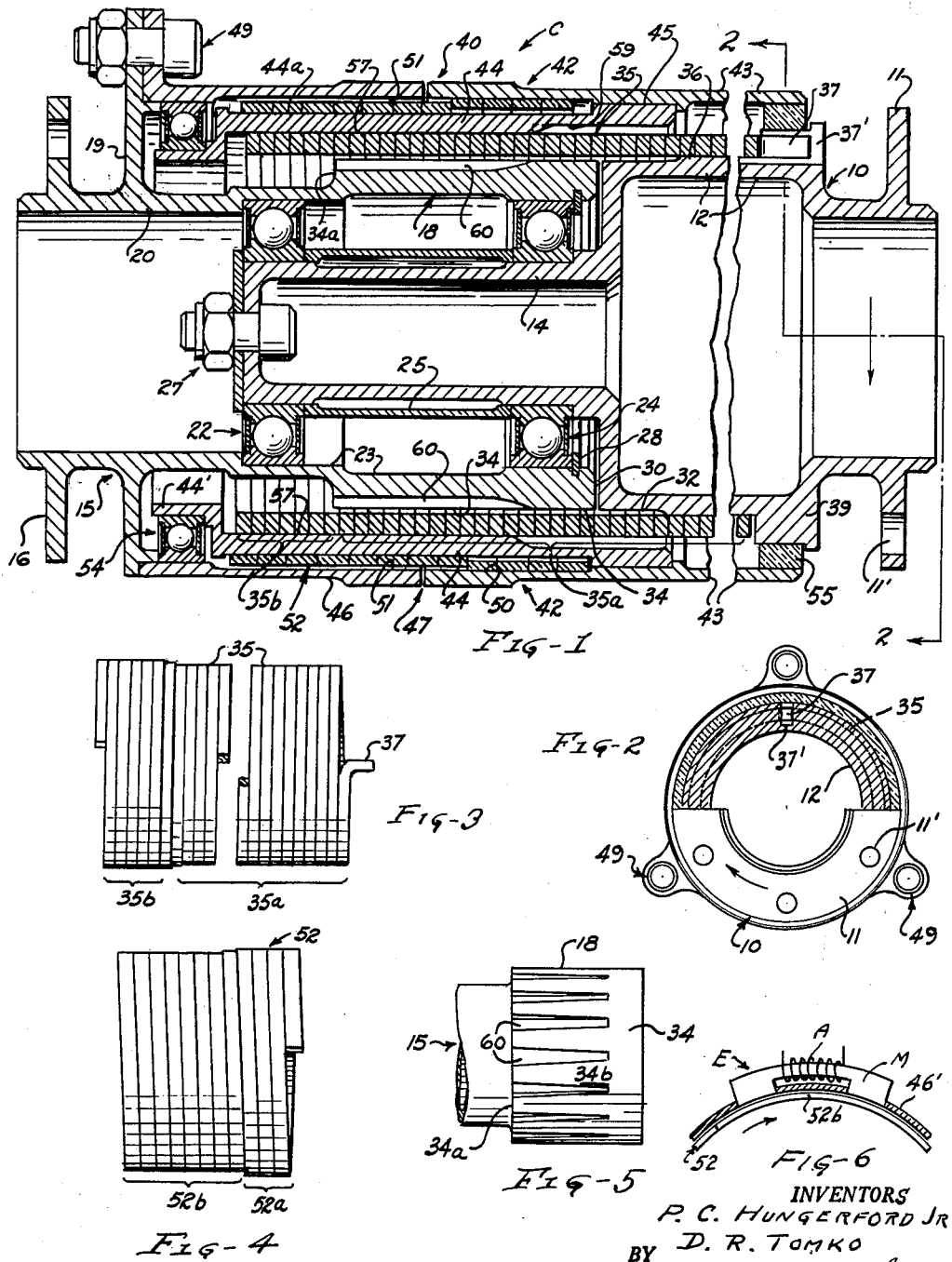

3,128,864
TORQUE LIMITING COIL OR SPRING CLUTCH
MECHANISMS
Philip C. Hungerford, Jr., Cleveland, and Donald R.
Tomko, East Cleveland, Ohio, assignors to Curtiss-
Wright Corporation, a corporation of Delaware
Filed Dec. 17, 1959, Ser. No. 860,129
4 Claims. (Cl. 192—81)

The present invention, as partially indicated by the above title, is especially adapted to serve as a heavy duty starting clutch mechanism unit, as between a starting engine or motor (input of unit) and a gas turbine or other internal combustion engine (output of unit) having high inertia load hence requiring high starting torque and presenting an important problem in respect to acceleration rate which must not be beyond the capacity of the unit to withstand shock. Preferably in the use of the present invention as a starter clutch (illustrated herewith), the starter engine or motor is of such nature that its speed can be variably controlled, hence definitely limited in r.p.m. value, and centrifugal force as a function of the input speed triggers actuation of the starter clutch mechanism unit. Said unit is of such nature that when the prime mover to be started attains the minimum speed at which it is certain to be self propelling an overrunning relationship obtains between the rotary output member of the clutch mechanism unit hereof and its input member, and such overrunning condition can continue indefinitely without generation of more than negligible heat in the starting clutch mechanism unit, regardless of whether or not the starting engine or motor is shut down after the starting operation has been completed.

Friction coil or helical spring clutch units capable of limited torque output have at least been proposed in various forms for many years. They have not usually proven satisfactory in operation largely because of the inherent instability of helically coiled friction clutching members at the torque rejection or load limiting point or where slippage is caused to take place between the spring and coacting drum surfaces for the purpose of the limiting input to output torque. Such tendency for the coil spring members to become destructively unstable at the torque limiting or load rejecting point can become obviated by using the springs to transmit designed definitely limited torque in the overrunning direction of the spring in reference to its coacting drum surfaces but this usually involves making the springs of undesirably large cross section (i.e., extremely stiff) since the effective torque is a function of spring stiffness or spring moment and the amount of preloading, there being no cumulative pressure action from coil to coil as in the case of a normally wound and operated clutch spring. The present invention in one aspect thereof provides main drive or torque delivery through a normally wound clutch spring on coacting drums and uses a high index or highly flexible centrifugally responsive energizer coil spring mechanism for actuating the main clutch spring and in such manner that the main clutch spring does not have to be unduly large in cross section, is stable in operation at the torque limiting or load rejection point and is so designed that heat generation necessarily incident to torque limiting slippage can be distributed over comparatively large areas hence relatively easily dissipated during critical periods of operation.

The present invention, as illustrated herewith, provides a normally disengaged type of coil or spring clutch assembly using a main and an auxiliary or energizer clutch spring wherein no difficult assembly operations are involved, largely because of coupling the springs to their associated parts solely through peripheral friction of the spring coils. Thus the use of so-called toes or tangs on the springs can be eliminated if desired as a further means of minimizing cost of manufacture of parts and assembly thereof. The auxiliary or energizer clutch spring can be rendered active and inactive otherwise than centrifugally or as a function of input speed.

Objects and advantages of the present invention not indicated above will become apparent from the following description showing a preferred form and arrangement or embodiment thereof. The essential characteristics are summarized in the claims.

In the drawing FIG. 1 is a substantially central axial sectional view of the clutch mechanism unit hereof in full scale arranged to serve as an engine starter. FIG. 2 is a reduced scale transverse sectional view taken as at line 2—2 on FIG. 1.

FIG. 3 is a fragmentary reduced scale side elevational view of the main helical clutch spring of FIG. 1 in a relaxed state; and FIG. 4 is a similar view of the auxiliary or energizing helical spring in a relaxed state.

FIG. 5 is a fragmentary view of a portion of an output drum member for coaction with the main helical spring of FIG. 3.

FIG. 6 is fragmentary view of a modification showing an electromagnetic device for controlling clutch operation.

The present starter clutch unit C is self contained and includes, as shown in FIG. 1, a hollow or tubular input drum member 10 having a drive flange 11 for suitable connection to the output or driving shaft of a starting engine or motor (not shown) as via a series of bolt holes 11' and a generally cylindrical drum portion 12 having a tubular reduced diameter coaxial extension portion 14. The main output drum member 15 is of sleeve like or tubular form having a flange 16 for connection with the engine or other prime mover to be started, a drum portion 18 axially adjacent the drum portion 12 of input drum member 10, and a circular flange 19 extending outwardly from a reduced diameter tubular portion 20 of the drum member 15. Additionally the two drum members 10 and 15 are formed to carry and axially locate suitable and preferably anti-frictional bearing assemblies 22 and 24 secured in a suitably stepped and shouldered counterbore 23 in the drum member 15 around the tubular portion 14 of the input drum member 10. The bearing assemblies 22 and 24 have an axial spacer sleeve 25 and demountable positioning and securing devices shown in the form of a bolt and washer assembly 27 at one end of the tubular extension 14 and a snap ring 28 or its equivalent at its opposite end. The positioning devices include a spacer sleeve 25 for the bearing assemblies 22 and 24 operating to establish and maintain a narrow crossover gap 30 between input and output drum portions 12 and 18 defined in part by generally cylindrical and diametrically equal external drum surface portions 32 and 34 of the respective drum members 10 and 15.

The main helical clutch spring 35 has input drum associated coils (part of group 35a FIG. 3) preloaded on a circular drum surface 36 of drum portion 12 somewhat larger in diameter than crossover-associated surface 32 of drum portion 12, and the spring 35 may additionally be positively anchored to the drum member 10 to turn therewith as by a conventional toe 37 of the spring in an axial slot 37' of a thickened circular flange portion 39 of the input drum member 10. Most of the coils 35a of clutch spring 35, in an inactive condition of the clutch mechanism, are in slightly radially spaced relationship to the associated drum surfaces 32 and 34 of the two drum members 10 and 15. A group of coils 35b of the spring 35 (cf. FIG. 3) are originally formed of larger diameter than the coils 35a; and coils 35b extend beyond the drum portion 18 of output drum member 15 or to the left as shown in FIG. 1. The control or centrifugally responsive energizer mechanism 40, as shown, is as follows:

A main clutch spring control unitary collar member or assembly 42, shown as having two parts 43 and 44 (which may be press fitted together as at 45 for assembly purposes) surrounds the clutch spring 35 and its associated drum portions and is supported to be free to turn relative to both drum members 10 and 15.

Additionally, the control mechanism 40 includes an output connected sleeve or drum 46 axially adjacent to the sleeve part 43 of collar unit 42, the sleeve 46 being attached rigidly to the output drum member 15 on its flange portion 19 as by three bolt and nut assemblies 49, FIGS. 1 and 2. Control drum members 43 and 46 have respective internal clutch drum surfaces 50 and 51 (defining a crossover 47) telescoped by associated coil portions of the auxiliary or energizer helical spring member 52 of FIGS. 1 and 4. The relationship of coils of the energizer spring 52 to its associated drum surfaces 50 and 51 will be described later.

The control collar member or assembly 42 is supported for free angular movement relative to the input and output drum members 10 and 15 on suitable bearings comprising, as shown, an anti-friction bearing assembly 54 around a reduced diameter end portion 44' of control collar part 44 and within the output-connected sleeve 46, and a bushing type (e.g. Oilite) bearing member 55 supported by the flange portion 39 of the input member 10 and disposed within a counterbore of control collar part 43. Bearing 55 serves only to allow limited angular movement between the input drum member 10 and the control collar unit 42 during main clutch spring engagement and disengagement, whereas, after the engine starting operation has been completed, continuous relative rotation between the output drum member 15 and the control collar unit 42, hence the suggested use of anti-friction bearing assembly 54.

With the above described arrangement the substantially rigid control collar assembly or unit 42 can turn easily in either direction i.e. clockwise or counterclockwise FIG. 2 with reference to the input drum member 10 and with reference to the output drum member 15. The coils of the main helical spring 35 which, as shown in FIG. 3, are of enlarged diameter in reference to coils 35a, are heavily preloaded against an associated portion of an internal cylindrical drum surface 57 of the control collar part 44. Thus all the coils of the main spring 35 which surround the output drum portion 18 and overhang that drum portion toward the left as shown in FIG. 1, are, during the non-driving or illustrated condition of the clutch unit C, in seated position against the internal drum surface 57, while the coils 35a have an established clearance all around the output drum surface 34. Such clearance is maintained entirely about the output drum portion 18 by the control collar assembly 42. Part 44 of the control collar assembly has a counterbore 59 at its right end establishing wide clearance around the coils which bridge the crossover gap 30 and drum surfaces 32 and 34.

Referring further to the auxiliary helical spring member 52, this member is "wound flat" so as to be relatively flexible or have a high spring index, the group of coils which bridge the cross over gap 47 and can normally (clutch unit idle) rest lightly for centering support on the external drum surface 44a of the control collar assembly 42. Oversize coils of group 52a are heavily preloaded for anchorage against the internal drum surface 50 of control collar part 43. Thereby when the control collar assembly is rotated clockwise as in FIG. 2, the coils 52a have normal coil-clutching action against the drum surface 50 so that the energizer spring 52 will turn clockwise as though it were a part of the control collar assembly. The step in the diameter of the auxiliary or energizing spring between its coils 52a and 52b as illustrated both in FIGS. 1 and 4 maintains the free end coils 52b of spring 52 definitely out of contact with the internal drum surface 51 of sleeve 46 which turns only when the output drum member 15 turns.

As shown in FIGS. 1 and 5 the external drum surface 34 of output drum portion 18 several spring coils distant from the crossover 30 is cylindrical and smooth for full contact gripping action of the crossover-associated coils of spring 35. Beyond that cylindrical portion of the drum surface 34, to the left in FIGS. 1 and 5, the surface is intersected by a series of axial slots 60 in the output drum portion 18 which are defined in part by an axial end shoulder portion 34a of the drum portion 18. As shown in FIG. 5, the slots 60 have converging sides so as gradually to increase the land or spring contacting areas 34b circumferentially of the drum portion 18 as the slots 60 approach the crossover region. When all the coils of the main spring 35 are in tight contact with associated external output drum surface portions 34 the static unit pressure of each spring coil on the interrupted land areas 34b is increased in a known manner over such static unit pressure as the coils would have around the drum portion 18 in the absence of the drum-surface-intersecting slots 60. An additional purpose served by the slots 60 is to distribute lubricant with which the spaces around and inside the main helical spring 35 are preferably charged during assembly of the unit or through suitable grease fittings not shown.

If the starting direction is clockwise as indicated by the arrow on FIG. 2 the main spring 35 is left hand wound so that, assuming the free end coils 35b are subjected to braking torque, intermediate coils of the spring will be contracted against the drum surfaces 32 and 34 with exponentially increasing radial gripping force toward the crossover 30. Energizing spring 52, for said direction of rotation, is right hand wound (or opposite of main spring 35 assuming the main spring is of the contracting-to-grip type, as shown), so that during rotation, as its left hand free end coils 35b are subjected to braking torque, the spring 52 will be expanded and have exponentially increasing force gripping contact toward the crossover 47.

*Operation*

When torque is applied to the input drum member 10 at below minimum engine starting speed the main helical spring 35 which turns with the drum member 10, rotates the control collar unit 42 at the same speed via the high overrunning frictional relationship of spring coils 35b against the internal drum surface 57 of the control collar assembly 42. As the speed imparted to the input drum member 10 is increased to a predetermined point (e.g. 1000–1200 r.p.m.), centrifugal expansion of auxiliary or energizer spring coils 52b against a now stationary internal drum member 46 results in self energizing locking action of coils of the spring 52 marginally adjacent the crossover 47 and positively causes angular movement to take place between the control collar assembly 42 and the input drum member 10. In other words lagging in speed is forced to occur temporarily on part of the control collar assembly 42 relative to input drum speed and in the proper direction to cause contraction of the main spring coils 35a against the output drum portion 18 via the high frictional overrunning drag connection of control collar surface 57 with the main spring coils 35b.

Since the amount of energizing torque applied to contract the coils 35a of the main spring 35 is readily predetermined by design (overrunning torque of coils 35b) the torque transmissible by the coils 35a from drum portion 12 to drum portion 18 can also be limited to a predetermined small range. While the speed of the output drum member 15 and its connected load is being accelerated to the speed of the input drum 10 slippage occurs, and heat is generated between the main clutch spring coils 35a and output drum surface 34. Since the coils of the spring 35 associated with the lands 34b defined by slots 60 (FIGS. 1 and 5) will have greater unit pressure on the drum portion 18 than they would have had in the absence of slot 60, the heat generated by slippage during acceleration of the clutch output drum member 15 has a greater opportunity to be conducted away from the critical region than would have been the case had the entire external surface of the drum portion 18 been cylindrical.

As the engine or other prime mover connected to the output drum member 15 attains self operating speed (i.e. above the 1000–1200 r.p.m. range of the starting engine or motor) the sleeve 46 connected rigidly to the output drum member 15 will overrun the still expanded free end coils 52b of the energizer spring 51, and, since that spring is connected to turn with the control collar assembly 42, such overrun will of itself produce angular movement of the assembly 42 opposite of its earlier described temporary "lagging" angular movement, and the main or driving helical spring 35 will substantially instantly expand clear of the output drum surface 34 freeing the clutch mechanism output of all frictional restraint except a light overrunning drag of the energizer spring coils 52b on the sleeve or drum surface 51. That slight drag ceases to obtain whenever the starting engine or motor speed drops below the critical point necessary to maintain the coils 52b expanded against the sleeve or drum 46. As rotation of the control collar assembly 42 ceases with shutting down of the starting prime mover or with lowering of its speed below the critical point for expanding the energizer spring, the only remaining parasitic drag or power loss in the mechanism C will be in the anti friction bearings 22, 24 and 52 which is negligible.

*Constructional Modifications*

As earlier indicated above, the energizing means for the main clutch spring 35 may be actuated otherwise than centrifugally. Any of various well known mechanical actuators can be used (e.g., to cause the free end coils 52b of the auxiliary clutch spring 52 to be subjected to torque by the load to which the present clutch mechanism C is connected, thereby temporarily to cause the control collar assembly 42 to lag angularly and the main clutch spring coils 35a to be contracted against the output drum surface 34). In FIG. 6 for example an electromagnetic device E (including at least one coil A and magnetic field core M) is diagrammatically shown arranged as on a non-magnetic drum member 46′ to complete a magnetic circuit through one or more of the free end coils 52b of spring 52 in order to expand those coils and actuate the clutch mechanism C at the will of an operator or automatically, through control of energization of coil A as though conductor rings, not shown, on the drum member 46′.

While the present clutch assembly C has one contracting-to-grip type clutch spring 35 and one expanding-to-grip type clutch spring 52 either spring can be of either type, depending principally upon desired design and the operating functions required. If the main clutch spring were to be of the expanding-to-grip type (requiring a main internal output drum member in place of external drum member 15), then, in accordance with known practice, slots (not shown) would preferably be formed externally in coils of the main clutch spring corresponding, in operative position as already described, to the slots 60 in the output drum member 15 of FIGS. 1 and 5 hereof.

We claim:

1. A normally disengaged helical coil clutch mechanism operable as a starter unit, comprising an input clutch drum member for connection to a starting prime mover, an output clutch drum member axially adjacent thereto and coaxial therewith for connection to an engine or similar load to be started, a main helical coil spring connected at one end to turn with the input drum member and having coils disposed intermediately of its opposite ends around but normally in radially spaced relationship to a clutch drum surface of the output drum member and having one or more free end coils extending axially beyond such drum surface in a direction away from the input drum member, a control collar journalled to turn freely independently of both drum members about said axis, the control collar having a circular drum surface against which said free end coil or coils are preloaded radially to drive the collar while permitting overrun of said coil or coils thereon when torque is applied to the spring in the starting direction, and centrifugal clutch means between the control collar and the output drum member arranged for operation at a critical predetermined speed of the input drum member and the control collar to cause the control collar to lag angularly behind the rotating input drum member and, via overrunning friction of the preloaded free end coil or coils of the main clutch spring on the control collar, move said intermediately disposed coils of the main spring into gripping contact with the clutch drum surface of the output drum member.

2. A normally disengaged helical coil clutch mechanism, comprising an input clutch drum member adapted to be turned unidirectionally, an output clutch drum member axially adjacent thereto and coaxial therewith adapted for connection to a normally non-rotating rotary load, a main helical coil clutch spring connected at one end to turn with the input drum member and having coils disposed intermediately of its opposite ends around but normally in radially spaced relationship to a clutch drum surface of the output drum member and having one or more free end coils extending axially beyond such drum surface in a direction away from the input drum member, a main clutch spring control collar journalled to turn freely independently of both the input and output drum members about said axis, the control collar having a circular drum surface against which said free end coil or coils of the main helical spring are preloaded radially in the overrunning direction of such coil or coils whereby to drive the collar through input torque applied to the spring, an energizing helical spring for the main clutch spring connected at one end to turn with the control collar and having free end coils at its opposite end, an actuating clutch drum member connected to turn with the output drum member and having its drum surface disposed radially adjacent said free end coils of the energizing spring but normally out of contact therewith, said clutch mechanism including means operating to cause the free end coils of the energizing helical spring frictionally to engage the drum surface of the actuating clutch drum member whereby to cause the control collar temporarily to lag angularly behind the rotating input drum member and, via overrunning friction of the preloaded free end coil or coils of the main clutch spring on the control collar, to move said intermediately disposed coils of the main spring into gripping contact with the clutch drum surface of the output drum member.

3. A normally disengaged helical coil clutch mechanism operable as a starter unit, comprising an input clutch drum member for connection to a starting prime mover, an output clutch drum member axially adjacent thereto and coaxial therewith for connection to an engine or similar load to be started, a main helical coil spring connected at one end to turn with the input drum member and having coils disposed intermediately of its opposite ends around but normally in radially spaced relationship to a clutch drum surface of the output drum member and having one or more free end coils extending axially beyond such drum surface in a direction away from the input drum member, a control collar journalled to turn freely independently of both drum members about said axis, the control collar having a circular drum surface against which said free end coil or coils are preloaded radially to drive the collar in the overrunning direction of said coil or coils when input torque is applied to the spring, an energizing helical spring for the main clutch spring connected at one end to turn with the control collar and having free end coils at its opposite end, an internal clutch drum surface connected to turn with the output drum member and surrounding said free end coils of the energizing spring normally out of contact therewith, said clutch mechanism operating at a critical predetermined speed of the input drum member and the control collar to expand the free end coils of the energizing spring centrifugally into contact with said internal drum surface connected to the output drum member whereby to cause the control collar temporarily to lag angularly behind the rotating input drum member and, via friction of the preloaded free end coil or coils of the main clutch spring on the control collar, move said intermediately disposed coils of the main spring into gripping contact with the associated clutch drum surface of the output drum member.

4. A normally disengaged helical coil clutch mechanism, comprising an input clutch drum member adapted to be turned in a predetermined driving direction, an output clutch drum member axially adjacent thereto and coaxial therewith and connected to a rotary load, a helical coil clutch spring connected at one end to turn with the input drum member and having coils disposed intermediately of its opposite ends around but normally in radially spaced relationship to a clutch drum surface of the output drum member and having one or more free end coils extending axially beyond the just mentioned drum surface in a direction away from the input drum member, a clutch spring control collar journalled to turn freely independently of both the input and output drum members about said axis, the control collar having a circular drum surface against which said free end coil or coils of the helical spring are preloaded radially and coiled in the direction to enable overrunning on such circular drum surface when input torque is applied to the spring by the input drum member in said driving direction, and energizing means for the clutch spring between the output drum member and the control collar and operative to apply load-imposed torque to the control collar and turn it temporarily relative to the input drum member oppositely of said predetermined driving direction, whereby to cause the intermediately disposed coils of the clutch spring to grip the associated clutch drum surface of the output drum member to drive the load, said energizing means comprising a pair of coaxial internal circular clutch drums, one connected to turn with the control collar and the other connected to turn with said output drum member, and a stepped diameter energizing clutch spring having its larger coils preloaded in the drum which is connected to the control collar and other, free end, smaller diameter coils normally out of gripping contact with the other internal drum and designed with sufficient flexibility to be urged into gripping contact therewith by centrifugal force at a predetermined speed of rotation of the input drum member.

References Cited in the file of this patent

UNITED STATES PATENTS

| | | |
|---|---|---|
| 875,757 | Watson | Jan. 7, 1908 |
| 1,886,692 | Kapitza et al. | Nov. 8, 1932 |
| 2,052,961 | Bonham | Sept. 1, 1936 |
| 2,551,739 | Harlan | May 8, 1951 |
| 2,615,543 | Maeser | Oct. 28, 1952 |
| 2,782,644 | Wiseman | Feb. 26, 1957 |
| 2,951,568 | Hungerford et al. | Sept. 6, 1960 |
| 2,976,976 | Parker | Mar. 28, 1961 |
| 2,984,325 | Tomko et al. | May 16, 1961 |

FOREIGN PATENTS

| | | |
|---|---|---|
| 507,389 | Canada | Nov. 16, 1954 |
| 540,660 | Canada | May 7, 1957 |
| 781,820 | Great Britain | Aug. 28, 1957 |